United States Patent [19]

Riem et al.

[11] 3,956,220

[45] May 11, 1976

[54] VINYL RESINS PLASTICIZED WITH MIXED MELLITATE COMPOUNDS

[75] Inventors: Roland Hendrick Riem, Oakville; Alfred Johannes Dieterman, Mississauga, both of Canada

[73] Assignee: Emery Industries, Inc., Cincinnati, Ohio

[22] Filed: Feb. 3, 1975

[21] Appl. No.: 546,538

Related U.S. Application Data

[62] Division of Ser. No. 417,585, Nov. 20, 1973, Pat. No. 3,888,909.

[30] Foreign Application Priority Data

Nov. 23, 1972 Canada .............................. 157257

[52] U.S. Cl. ........................... 260/31.6; 260/31.8 B; 260/31.8 HR; 260/31.8 AN; 260/31.8 W; 260/31.8 G

[51] Int. Cl.² ..................... C08K 5/12; C08L 27/06

[58] Field of Search ................. 260/31.8 G, 31.8 B, 260/475 P, 31 G, 31.8 W

[56] References Cited

UNITED STATES PATENTS

| | | | |
|---|---|---|---|
| 1,786,404 | 12/1930 | Young | 260/475 P |
| 3,351,604 | 11/1967 | Safford et al. | 260/31.8 B |
| 3,444,237 | 5/1969 | Jaffe | 260/31.8 B |

*Primary Examiner*—Allan Lieberman
*Attorney, Agent, or Firm*—G. A. Baracka; J. D. Rice

[57] ABSTRACT

Mixed mellitate compounds useful as plasticizers for vinyl polymers, such as polyvinyl chloride homopolymers and copolymers, which have increased resistance to hydrocarbons have been prepared. The mixed mellitates of this invention are derived from trimellitic acid and trimellitic anhydride and contain two ester moieties derived from monofunctional alcohols and a third complex ester group obtained either by the reaction of a diol, a dibasic acid and a monofunctional alcohol or by the reaction of a diol and a monobasic acid.

3 Claims, No Drawings

VINYL RESINS PLASTICIZED WITH MIXED MELLITATE COMPOUNDS

This is a division of application Ser. No. 417,585, filed Nov. 20, 1973 and now U.S. Pat. No. 3,888,909.

BACKGROUND OF THE INVENTION

Plasticizers derived from trimellitic acid and trimellitic anhydride are known and used extensively with vinyl halide resins. Tri(2-ethylhexyl) trimellitate, for example, has been demonstrated to be an effective plasticizer for polyvinyl chloride. Other simple trimellitate esters have been described by Paul C. Dougherty et al in their article entitled "Vinyl Plasticizers from Trimellitic Anhydride," found in the Technical Papers, Volume VIII, presented at the Eighteenth Annual Technical Conference of the SPE in January, 1962. U.S. Pat. Nos. 3,444,237 and 3,043,792 also describe the use of esters of cyclohexane-1,2,4-tricarboxylic acid and esters of trimesic acid as plasticizers for polyvinyl chloride polymers.

Trimellitate plasticizers, in general, have satisfactory volatility, viscosity and low temperature performance characteristics, however, their resistance to hydrocarbons is poor. For this reason they are generally not acceptable in applications where the plasticized resin compositions are exposed to hydrocarbons such as oil, gasoline and other solvents. This one shortcoming, that is, poor resistance to extraction by hydrocarbons, precludes their use in resin formulations for automotive applications such as ignition wiring insulation and the like.

It would be desirable if trimellitate plasticizers were available which had improved resistivity to hydrocarbons and which could be readily compounded with vinyl halide resins for use in automotive applications. It would be even more advantageous if the other properties typically associated with the use of trimellitate plasticizers were not adversely affected. These trimellitate plasticizers would be even more useful if they could be easily prepared and were relatively low cost materials.

SUMMARY OF THE INVENTION

We have now discovered mixed trimellitate compositions useful as plasticizers for vinyl halide resins which have improved resistance to hydrocarbons. The mixed mellitates of this invention are derived from trimellitic anhydride and/or trimellitic acid and contain two simple ester moieties derived from saturated monofunctional alcohols containing from 1 to 22 carbon atoms and a third complex ester moiety obtained either by the reaction of a saturated diol containing 2 to 8 carbon atoms, a saturated dibasic acid containing from 4 to 22 carbon atoms and a saturated mono-functional alcohol containing from 1 to 22 carbon atoms or by the reaction of a saturated diol containing 2 to 8 carbon atoms and a saturated monobasic acid containing from 2 to 22 carbon atoms. The mixed mellitate plasticizers have improved resistance to hydrocarbon extraction without sacrificing any of the other desirable properties common to trimellitates such as low volatility, low viscosity and low temperature performance. The mixed mellitates are useful with variety of vinyl polymers but are especially useful with vinyl halide polymers, particularly polyvinyl chloride homopolymers and copolymers. The amount of plasticizer employed may range from about 5 to about 100 parts by weight per 100 parts of the vinyl polymer.

DETAILED DESCRIPTION

The present invention relates to compositions of matter having the formula:

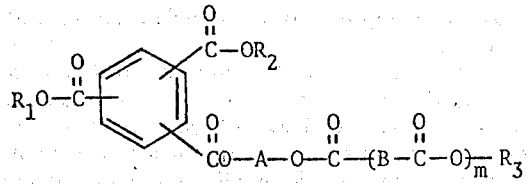

wherein $R_1$, $R_2$ and $R_3$ are hydrocarbon radicals, either the same or different, containing from 1 to 22 carbon atoms; A is a bivalent branched or straightchain saturated hydrocarbon radical containing from 2 to 8 carbon atoms; B is a bivalent branched, cyclic or straight-chain saturated hydrocarbon radical containing from 2 to 20 carbon atoms; and $m = 1$ or $0$. The invention also relates to compositions of vinyl polymers containing plasticizing amounts of the aforementioned mixed mellitates.

The present trimellitate compositions are preferably mixed esters derived from trimellitic acid or trimellitic anhydride and have two adjacent ester groups substituted on the aromatic nucleus. Mixed esters obtained from trimesic acid or hemimellitic acid or anhydride may also be useful. The preferred plasticizer compounds correspond to the formula

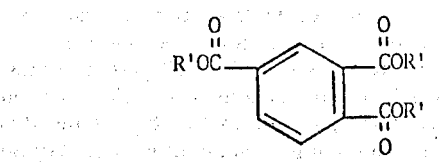

wherein $R'$ represents the $R_1$, $R_2$ and

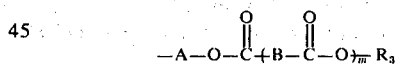

radicals defined above. From the formula it is observed that the preferred mixed mellitates are not a single molecular species but, in fact, consist of a mixture of three different isomers. This is a result of the method of preparation and in no way affects the effectiveness of the resulting plasticizer compositions. All of the possible isomers are useful plasticizers in accordance with the terms of this invention and may be individually employed or present as a mixture with one or both of the other isomeric forms. The trimellitate compositions may also contain up to about 10 percent by weight of by-products arising from transesterification occurring during the synthesis.

The saturated bivalent radical A is derived from diols containing 2 to 8 carbon atoms. Especially useful diols for the present invention are ethylene glycol, 1,2- or 1,3-propanediol, 1,3-, 1,4- and 2,3-butanediol, pentanediols and hexanediols.

Th saturated bivalent radical B, which is preferably an alkyl radical, is derived from dibasic acids containing from about 4 to about 22 carbon atoms. Typical acids useful in the formation of the complex ester group include succinic acid, glutaric acid, adipic acid, pimelic acid, suberic acid, azelaic acid, sebacic acid, undecanedioic acid, dodecandioic acid, tridecanedioic acid, decadecanedioic acid, pentadecanedioic acid, brassylic acid, and the like. Mixtures of acids of the above types may be employed. Especially useful dibasic acids for the present invention include adipic acid and sebacic acid.

The monofunctional alcohols from which the radicals $R_1$, $R_2$ and $R_3$ are derived when $m = 1$, may range from the simplest saturated alcohols up to alcohols containing 22 carbon atoms. These alcohols may be branched or straight-chain. $R_1$, $R_2$ and $R_3$ may all be the same or different depending on the alcohols employed. Monofunctional alcohols useful for the present invention include methyl alcohol, ethyl alcohol, n-propyl alcohol, isopropyl alcohol, n-butyl alcohol, isobutyl alcohol, sec-butyl alcohol, t-butyl alcohol, 2-ethylhexyl alcohol, n-octyl alcohol, lauryl alcohol, myristyl alcohol, cetyl alcohol, stearyl alcohol, and the like.

In the case that $m = 0$, the monofunctional alcohols from which the radicals $R_1$ and $R_2$ are derived are as indicated in the immediately preceding paragraph. $R_3$ in this case is preferably derived from branched or straight-chain saturated monocarboxylic acids containing from 5 to 22 carbon atoms. Mixtures of these acids may also be employed. Monofunctional acids useful for the present invention include valeric acid, caproic acid, n-heptylic acid, pelargonic acid, caprylic acid, lauric acid, myristic acid, palmitic acid, stearic acid and arachidic acid.

In a preferred form of this invention $R_1$, $R_2$ and $R_3$ of the formula are saturated hydrocarbon radicals containing from 4 to 18 carbon atoms and, more preferably, alkyl radicals containing 6 to 12 carbon atoms. Excellent plasticizer compositions result when A is an alkyl radical containing from 2 to 4 carbon atoms, B is an alkyl radical containing from about 6 to 18 carbon atoms and m is 1. Especially effective mixed trimellitate plasticizer compositions have $R_1=R_2=R_3=R_8=H_{17}$, such as the 2-ethylhexyl group, with A being derived from ethylene glycol or 1,2-propanediol or 1,3-butanediol and B derived from adipic acid. The complex ester group

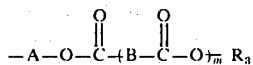

for these compositions, when $m = 1$, would have the respective structures

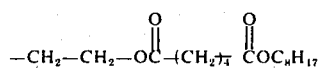

and

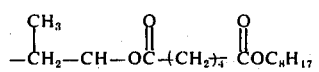

and

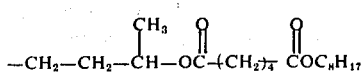

To obtain the mixed mellitate compounds of this invention any number of techniques may be employed, however, the usual procedure is to first react 1 mole of trimellitic anhydride or trimellitic acid with 2 mols of a mono-functional alcohol or alcohol mixture to form the trimellitate diester which is a mixture of three isomeric forms. This reaction is represented by the equation:

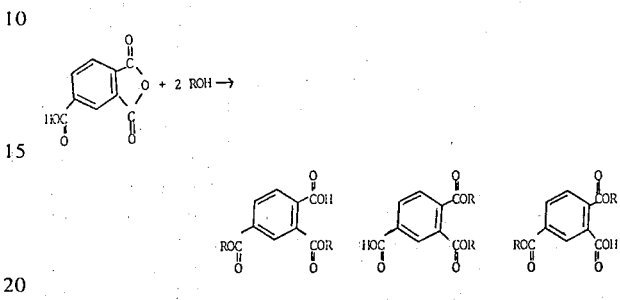

Small amounts of monoester and triester materials may also be present. Subsequent reactions with the diester are conducted in step-wise manner by charging the reactants individually. With this procedure the trimellitate diester is reacted with 1 mol of a suitable diol and when the reaction is complete, or essentially so, a mol of dibasic acid in the case $m = 1$ or a mol of monobasic acid in the case $m = 0$ is charged and the reaction continued. Finally, in the $m = 1$ case a monofunctional alcohol is charged to the reactor. Suitable catalysts may be employed to facilitate any of the esterification reactions involved. One such catalyst is dibutyl tin oxide.

The intermediate products formed during any of these reactions, such as the diester or any of the subsequent products derived therefrom, may be isolated at any stage in the process or the process may be conducted continuously by simply adding the next reactant with or without additional catalyst when the prior reaction is complete or essentially complete.

Compounds of this invention find utility as plasticizers for vinyl polymers such as polyvinyl chloride homopolymers and copolymers. In addition to having the usual characteristics associated with previously known trimellitate plasticizers such as good volatility, good low temperature properties and low viscosity, the mixed mellitates also have markedly improved resistance to extraction by hydrocarbons such as hexane and oils. This is extremely important for automotive wire applications where a high degree of resistivity to hydrocarbons is required.

In accordance with the present invention the mixed mellitate compositions are useful for plasticizing vinyl polymers. The term vinyl polymers is intended to encompass both homopolymers and copolymers derived from vinyl monomers, that is, compounds containing the $CH_2 = C\!<$ group. Most commonly the vinyl polymers useful for this invention are prepared by the polymerization of one or more monomers selected from the group consisting of vinyl chloride; vinyl bromide; vinyl acetate; vinylidene chloride; lower allyl esters; vinyl alkyl ethers; and acrylic and methacrylic esters such as ethyl acrylate, methyl acrylate, and methyl methacrylate; acrylic acid and methacrylic acid; acrylonitrile and methacrylonitrile; and the like. Typical copolymer compositions may be obtained by the copolymerization of vinyl chloride with vinyl acetate; vinyl chloride with vinyl butyrate; vinyl chloride with vinyl propionate; vinyl chloride with vinylidene chloride; vinyl chloride with methyl acrylate; vinyl chloride with 2-ethylhexyl acrylate; and vinyl chloride with two or more monomers such as mixtures of vinylidene chloride, and 2-ethylhexyl acrylate; and the like. The plasticizers are also useful for acrylonitrilebutadiene-styrene terpolymers, chloroprene polymers, butadiene-styrene copolymers, butadiene-acrylonitrile copolymers, polystyrene, polyacetals, and the like. Especially useful and effective plasticization is obtained when the present mixed mellitates are employed with polyvinyl chloride homopolymer and copolymers of vinyl chloride with one or more other copolymerizerable vinyl monomers.

In general, the amount of mixed mellitate plasticizer used may range from about 5 to 100 parts by weight per 100 parts by weight of the vinyl polymer. Excellent results are obtained when about 10 to about 70 parts by weight of the mixed mellitate is employed per 100 parts by weight of the polyvinyl chloride homopolymer or copolymer. Such compositions exhibit a high degree of resistivity to extraction with hydrocarbons such as oil and hexane and are especially useful for automotive wire coating applications.

The mixed mellitate compositions are incorporated into the vinyl polymers prior to curing, molding or extruding. They may be incorporated by mixing the powdered resin with the liquid plasticizer followed by mixing and/or kneading or they may be mixed on a heated mill. The plasticizer may be added as such, in a masterbatch solution, or the plasticizer may be emulsified and the emulsion added to the polymeric material. In general the plasticized compositions have excellent milling characteristics and require no special processing. The mixed mellitates may be used in conjunction with other primary plasticizers such as dioctyl phthalate, diisooctyl phthalate, dioctyl adipate, trioctyl phosphate, various polymeric plasticizers, epoxides, and the like. They may also be incorporated with other compounding ingredients including antioxidants such as phosphites, amines and phenols; pigments and other colorants; fillers; lubricants; antisticking agents; curing agents; and the like. The mixed mellitate plasticizers and the various compounding ingredients may be prepared as a masterbatch and added to the polymer as such or the various ingredients may be mixed in separately.

The following examples illustrate the invention more fully, however, they are not intended as a limitation on the scope thereof. In the example all parts and percentages are on a weight basis unless otherwise indicated.

EXAMPLE I

Into a glass reactor fitted with a stirrer, thermometer, fractionating column, condenser and nitrogen inlet were charged 192 grams (1 mol) trimellitic anhydride, 260 grams (2 mols) 2-ethylhexanol and 0.5 grams dibutyl tin oxide catalyst. By maintaning the reaction mixture at 190°C and 160 mm absolute pressure a steady reflux was obtained and the temperature at the top of the column maintained between 100° and 105°C. After about an hour the theoretical amount of water had been removed and the acid number of the product was about 124 indicating the formation of the di-2-ethylhexyl trimellitate. At this point the vacuum was released by introduction of nitrogen into the system until atmospheric pressure was established in the reactor. 90 Grams (1 mol) 1,3-butanediol was then charged with 0.5 grams dibutyl tin oxide while increasing the temperature to about 235°C. After about one hour the acid value was 1.1 and the product had a molecular weight of 520 (theoretical 506) with a hydroxyl value of 107 (theoretical 111). Reaction was continued without isolation of the intermediates by introducing 146 grams (1 mol) adipic acid and an additional 0.5 grams dibutyl tin oxide into the reactor while maintaining the temperature at 235°C and applying a vacuum of 50 mm absolute pressure. After a reaction period of about 30 minutes indications were that this phase of the reaction was essentially complete and 130 grams (1 mol) 2-ethyl hexanol was then added with additional dibutyl tin oxide catalyst. This final reaction step was carried out at 230°C and 100 mm absolute pressure for 1 ½ hours. The final product had an acid value of 4 and an average molecular weight of 750 (theoretical 746). Properties of the mixed mellitate composition are listed in Table I.

EXAMPLE II

Following a procedure similar to that described in Example I a mixed mellitate was prepared by reacting trimellitic anhydride, 2-ethyl hexanol, 1,2-propanediol and adipic acid. The order of charging the reactants and the amounts employed were identical to that of Example I except that 1,3-butanediol was replaced with 76 grams (1 mol) 1,2-propanediol. Table I lists the properties of the mixed mellitate obtained from this reaction.

EXAMPLE III

The reaction was repeated substituting 193 grams (1 mol) azelaic acid for the adipic acid. The acid value of the di-2-ethylhexyl trimellitate formed in the first step of the reaction was 127. The hydroxyl value of the product obtained after reaction with the 1,3-butanediol was 113 (theoretical 111). The acid value of the final mixed mellitate product was 3. Other properties of the mixed mellitate composition are set forth in Table I.

EXAMPLE IV

The same reaction procedure was employed to react 192 grams trimellitic anhydride, 390 grams 2-ethyl hexanol, 62 grams ethylene glycol and 193 grams azelaic acid. Samples taken after each of the 4 reaction steps had the following acid values:

| | | |
|---|---|---|
| Step 1. | After reaction with the 2-ethyl hexanol to form the diester | AV=125 (theoretical 129) |
| Step 2. | After reaction with the ethylene glycol | AV=2.4 (theoretical 0) |
| Step 3. | After reaction with the azelaic acid | AV=91 (theoretical 86) |
| Step 4. | After reaction with the 2-ethyl hexanol to cap the complex ester group and give the final product | AV=1 (theoretical 0) |

Physical characteristics of the mixed mellitate composition are reported in Table I.

TABLE I

| PROPERTIES OF MIXED MELLITATES | | | | |
|---|---|---|---|---|
| | Product of Example I | Product of Example II | Product of Example III | Product of Example IV |
| Colour | 400 APHA | 11 G* | 11 G* | 12 G* |
| Viscosity cs at 25°C | 649 | 432 | 485 | 710 |
| Refractive Index $n_D^{25}$ | 1.483 | 1.482 | 1.484 | 1.484 |
| Specific Gravity, 25°C | 1.029 | 1.022 | 1.012 | 1.024 |

*G = Gardner

EXAMPLE V

To demonstrate the utility of the mixed mellitate compositions as plasticizers for vinyl halide resins the mixed mellitate compositions of Examples I-IV were formulated as follows:

| 100 Parts | — | Vinyl chloride resin (Geon 102 EP-FS - B. F. Goodrich Chemical Co.) |
|---|---|---|
| 2 Parts | — | Ferro 1820 (barium-cadmium stabilizer produced by Federal Chemical) |
| 1 Part | — | Ferro 903 (liquid organic inhibitor produced by Federal Chemical) |
| 55 Parts | — | Plasticizer |

The resulting resin compositions had the following physical properties:

| | PLASTICIZER OF | | | |
|---|---|---|---|---|
| | Example I | Example II | Example III | Example IV |
| Percent Elongation | 310 | 320 | 300 | 295 |
| 100% Modulus (PSI) | 1800 | 1775 | 1650 | 1750 |
| Tensile (PSI) | 3300 | 3300 | 2995 | 2950 |
| Hardness (Ins/10 sec.) | 91/85 | 84/78 | 92/87 | 91/87 |

To demonstrate the improvement in resistivity to hydrocarbon extraction obtained with the mixed mellitates of the present invention the so-prepared plasticized vinyl compositions were immersed in standard white mineral oil (Atreol No. 9) and hexane at 50°C. Samples were observed after 24 hours immersion and the weight loss of the resin samples recorded. An identical polyvinyl chloride formulation plasticized with 55 parts trioctyl trimellitate (TOTM) was used as a control for comparative purposes. Results of the extraction study were as follows:

| Resin Plasticized With: | % Weight Loss After Extraction With Mineral Oil | % Weight Loss After Extraction With Hexane |
|---|---|---|
| Product of Example I | 1.7 | 9.8 |
| Product of Example II | 2.2 | 13.0 |
| product of Example III | 2.04 | 10.07 |
| Product of Example IV | 1.89 | 10.93 |
| TOTM | 7.72 | 27.58 |

The preceding data clearly demonstrates that the products of this invention are excellent primary plasticizers and that they have markedly improved resistivity to oil and hexane extraction compared to a known trimellitate plasticizer.

We claim:

1. A plasticized vinyl resin composition having improved resistance to hydrocarbons comprising 100 parts by weight of a vinyl halide resin selected from the group consisting of polyvinyl chloride homopolymer and polyvinyl chloride copolymer and 5 to 100 parts of a mixed mellitate composition of the formula

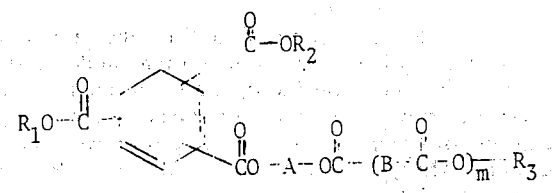

wherein $R_1$, $R_2$ and $R_3$ are saturated hydrocarbon radicals containing from 1 to 22 carbon atoms, A is a saturated bivalent hydrocarbon radical containing from 2 to 8 carbon atoms, B is a saturated bivalent hydrocarbon radical containing 2 to 20 carbon atoms and m is an integer of 1 or 0.

2. The resin composition of claim 1 wherein the mixed mellitate is derived from trimellitic acid or trimellitic anhydride and has the formula

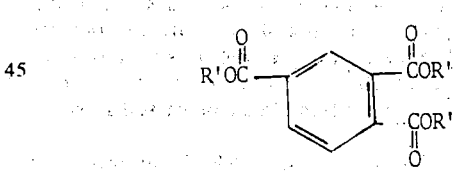

wherein R' represents the radicals $R_1$, $R_2$ and

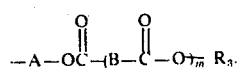

3. The resin composition of claim 2 containing from 10 to 70 parts of a mixed mellitate wherein $R_1$, $R_2$ and $R_3$ are —$C_8H_{17}$ radicals, m is equal to 1, A is derived from a diol selected from the group consisting of ethylene glycol, 1,3-propanediol, 1,2-propanediol, 1,3-butanediol, 1,4-butanediol and 2,3-butanediol and B is a bivalent saturated radical derived from adipic acid or sebacic acid.

* * * * *